United States Patent
Petersson et al.

(10) Patent No.: US 10,375,720 B2
(45) Date of Patent: Aug. 6, 2019

(54) BEAM MANAGEMENT OF A RADIO TRANSCEIVER DEVICE

(71) Applicant: Telefonaktiebolaget LM Ericsson (publ), Stockholm (SE)

(72) Inventors: Sven Petersson, Sävedalen (SE);
Fredrik Athley, Kullavik (SE);
Andreas Nilsson, Göteborg (SE)

(73) Assignee: Telefonaktiebolaget LM Ericsson (Publ) (SE)

( * ) Notice: Subject to any disclaimer, the term of this patent is extended or adjusted under 35 U.S.C. 154(b) by 0 days.

(21) Appl. No.: 15/573,021

(22) PCT Filed: Oct. 31, 2017

(86) PCT No.: PCT/EP2017/077897
§ 371 (c)(1),
(2) Date: Nov. 9, 2017

(65) Prior Publication Data
US 2019/0132858 A1    May 2, 2019

(51) Int. Cl.
*H04W 16/28* (2009.01)
*H04W 72/04* (2009.01)
*H04W 72/06* (2009.01)
*H04W 72/08* (2009.01)
(Continued)

(52) U.S. Cl.
CPC ....... *H04W 72/1278* (2013.01); *H04W 16/28* (2013.01); *H04W 72/046* (2013.01); *H04W 72/06* (2013.01); *H04W 72/085* (2013.01); *H04W 72/14* (2013.01)

(58) Field of Classification Search
CPC ... H04B 7/1855; H04B 7/2041; H04W 16/00; H04W 16/24; H04W 16/28; H04W 16/30; H04W 16/32; H04W 72/044
See application file for complete search history.

(56) References Cited

U.S. PATENT DOCUMENTS

2015/0341105 A1* 11/2015 Yu .................. H04B 7/088
                                                        370/328
2016/0365900 A1    12/2016 Kim et al.

FOREIGN PATENT DOCUMENTS

WO         2015176679 A1    11/2015

OTHER PUBLICATIONS

International Search Report and Written Opinion dated Jul. 11, 2018, for corresponding International Application No. PCT/EP2017/077897 filed on Oct. 31, 2017, consisting of 12-pages.

* cited by examiner

*Primary Examiner* — Chandrahas B Patel
(74) *Attorney, Agent, or Firm* — Christopher & Weisberg, P.A.

(57) ABSTRACT

There is provided mechanisms for beam management of a radio transceiver device. A method is performed by the radio transceiver device. The method includes receiving a data and/or control signalling segment in a fixed reference beam. The method includes, whilst doing so, initiating a beam sweep in a candidate beam set, whereby part of the data and/or control signalling segment is received in each of the beams in the candidate beam set. The method includes then evaluating, based on the part of the data and/or control signalling segment received in each of the beams in the candidate beam set and using restored symbols of the data and/or control signalling segment received in the fixed reference beam as reference, a quality metric for each of the beams in the candidate beam set.

21 Claims, 4 Drawing Sheets

(51) Int. Cl.
*H04W 72/12* (2009.01)
*H04W 72/14* (2009.01)

BEAM MANAGEMENT OF A RADIO TRANSCEIVER DEVICE

CROSS-REFERENCE TO RELATED APPLICATIONS

This application is a Submission Under 35 U.S.C. § 371 for U.S. National Stage Patent Application of International Application Number: PCT/EP2017/077897, filed Oct. 31, 2017 entitled "BEAM MANAGEMENT OF A RADIO TRANSCEIVER DEVICE," the entirety of which is incorporated herein by reference.

TECHNICAL FIELD

Embodiments presented herein relate to a method, a radio transceiver device, a computer program, and a computer program product for beam management of the radio transceiver device.

BACKGROUND

In communications networks, there may be a challenge to obtain good performance and capacity for a given communications protocol, its parameters and the physical environment in which the communications network is deployed.

For example, for future generations of mobile communications networks, frequency bands at many different carrier frequencies could be needed. For example, low such frequency bands could be needed to achieve sufficient network coverage for terminal devices and higher frequency bands (e.g. at millimeter wavelengths (mmW), i.e. near and above 30 GHz) could be needed to reach required network capacity. In general terms, at high frequencies the propagation properties of the radio channel are more challenging and beamforming both at the network node of the network and at the terminal devices might be required to reach a sufficient link budget.

In a communications network where a transmission and reception point (TRP) at the network side uses narrow beams for transmission, at least one of the narrow transmission beams is assumed to be discovered and monitored for each served terminal device at the user side. This process of discovering and monitoring is referred to as beam management. In order to perform beam management the network node uses measurements (such as received reference signal power), as obtained and reported by the served terminal devices, on downlink reference signals such as channel state information reference signals (CSI-RS). The beam pair for which the highest received reference signal power was obtained is then used as the active beam pair link.

In general terms, a beam pair is defined by a transmission beam at the transmitting end (such as at the TRP) and a corresponding reception beam at the receiving end (such as at the terminal device), where the transmission beam and the reception beam are selected from sets of available candidate beams so as to maximize a quality criterion (such as highest received reference signal power) for transmission from the transmitting end to the receiving end.

The CSI-RS for beam management might be transmitted periodically, semi-persistently or aperiodically (for example when being event triggered) and they might either be shared between multiple terminal devices or be specific for a certain terminal device, or group of terminal devices. It is desirable to have as few always-on signals as possible in the communications network in order to reduce the power consumption and generated interference. Hence, aperiodically event triggered beam management might be preferred in many cases. Still, beam management might require large overhead signaling and be time consumption, especially for analog and hybrid antenna array implementations at the TRP where beams must be swept in a sequential manner.

Hence, there is still a need for an improved beam management of radio transceiver devices, such as beam management of terminal devices and network nodes.

SUMMARY

An object of embodiments herein is to provide efficient beam management of radio transceiver devices.

According to a first aspect there is presented a method for beam management of a radio transceiver device. The method is performed by the radio transceiver device. The method comprises receiving a data and/or control signalling segment in a fixed reference beam. The method comprises, whilst doing so, initiating a beam sweep in a candidate beam set, whereby part of the data and/or control signalling segment is received in each of the beams in the candidate beam set. The method comprises then evaluating, based on the part of the data and/or control signalling segment received in each of the beams in the candidate beam set and using restored symbols of the data and/or control signalling segment received in the fixed reference beam as reference, a quality metric for each of the beams in the candidate beam set.

According to a second aspect there is presented a radio transceiver device for beam management of the radio transceiver device. The radio transceiver device comprises processing circuitry. The processing circuitry is configured to cause the radio transceiver device to receive a data and/or control signalling segment in a fixed reference beam. The processing circuitry is configured to cause the radio transceiver device to, whilst doing so, initiate a beam sweep in a candidate beam set, whereby part of the data and/or control signalling segment is received in each of the beams in the candidate beam set. The processing circuitry is configured to cause the radio transceiver device to then evaluate, based on the part of the data and/or control signalling segment received in each of the beams in the candidate beam set and using restored symbols of the data and/or control signalling segment received in the fixed reference beam as reference, a quality metric for each of the beams in the candidate beam set.

According to a third aspect there is presented a radio transceiver device for beam management of the radio transceiver device. The radio transceiver device comprises a receive module configured to receive a data and/or control signalling segment in a fixed reference beam. The radio transceiver device comprises an initiate module configured to initiate a beam sweep in a candidate beam set, whereby part of the data and/or control signalling segment is received in each of the beams in the candidate beam set. The radio transceiver device comprises an evaluate module configured to evaluate, based on the part of the data and/or control signalling segment received in each of the beams in the candidate beam set and using restored symbols of the data and/or control signalling segment received in the fixed reference beam as reference, a quality metric for each of the beams in the candidate beam set.

Advantageously this method, these radio transceiver devices, this computer program and this computer program product provide efficient beam management of the radio transceiver device.

Advantageously this method, these radio transceiver devices, this computer program and this computer program product enable efficient beam management without requiring extra time/frequency resources for the beam management, thus not resulting in any overhead signalling.

According to a fourth aspect there is presented a computer program for beam management of the radio transceiver device, the computer program comprising computer program code which, when run on a radio transceiver device, causes the radio transceiver device to perform a method according to the first aspect.

According to a fifth aspect there is presented a computer program product comprising a computer program according to the fourth aspect and a computer readable storage medium on which the computer program is stored. The computer readable storage medium could be a non-transitory computer readable storage medium.

It is to be noted that any feature of the first, second, third, fourth, and fifth aspects may be applied to any other aspect, wherever appropriate. Likewise, any advantage of the first aspect may equally apply to the second, third, fourth, and/or fifth aspect, respectively, and vice versa. Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, module, step, etc." are to be interpreted openly as referring to at least one instance of the element, apparatus, component, means, module, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which.

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any step or feature illustrated by dashed lines should be regarded as optional.

Figure 1:
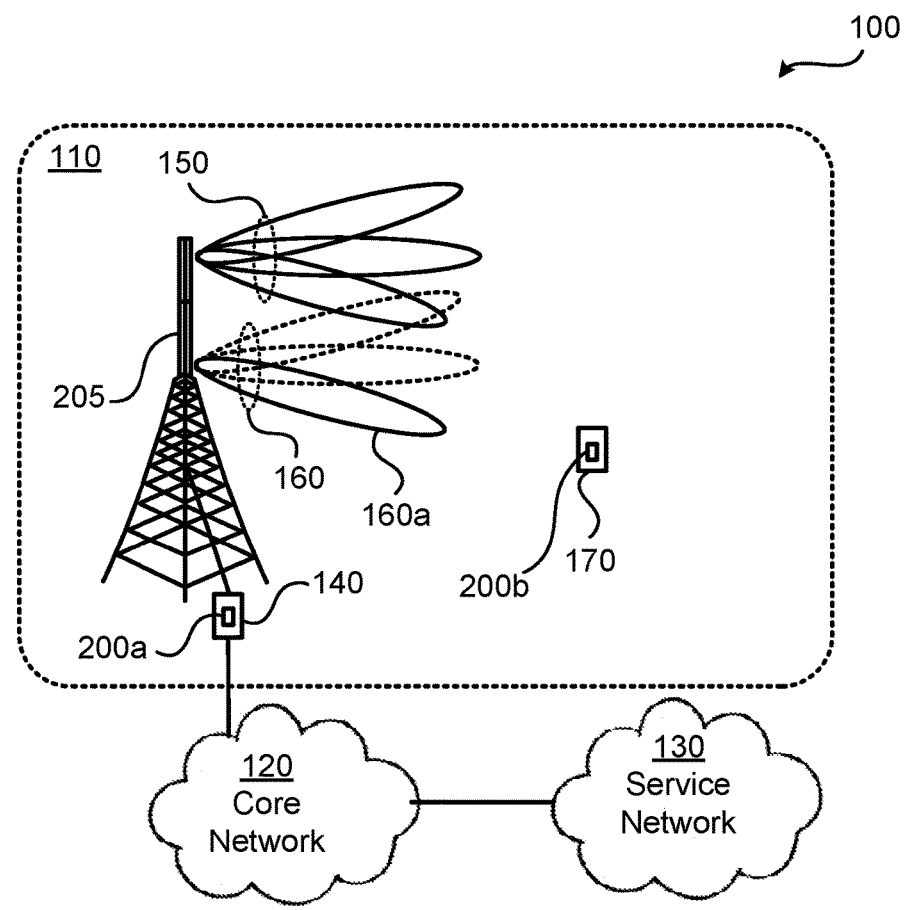
FIG. 1 is a schematic diagram illustrating a communications network according to embodiments.

FIG. 1 is a schematic diagram illustrating a communications network 100 where embodiments presented herein can be applied.

The communications network 100 comprises a network node 140 configured to, via a TRP 205, provide network access to a terminal device 170 in a radio access network 110. In some embodiments a radio transceiver device 200a is part of, integrated with, or collocated with the network node 140 or the TRP 205. In some embodiments a radio transceiver device 200b is part of, integrated with, or collocated with, the terminal device 160.

The radio access network 110 is operatively connected to a core network 120. The core network 120 is in turn operatively connected to a service network 130, such as the Internet. The terminal device 170 is thereby, via the TRP 205 and the network node 140, enabled to access services of, and exchange data with, the service network 130.

Examples of network nodes are radio access network nodes, radio base stations, base transceiver stations, Node Bs, evolved Node Bs, g Node Bs, access points, and access nodes. Examples of terminal devices are terminal devices, mobile stations, mobile phones, handsets, wireless local loop phones, user equipment (UE), smartphones, laptop computers, tablet computers, network equipped sensors, network equipped vehicles, and so-called Internet of Things devices.

The herein disclosed embodiments can be applied at a radio transceiver device 200a being part of, integrated with, or collocated with, the network node 140 as well as at a radio transceiver device 200b being part of, integrated with, or collocated with, the terminal device 170.

The radio transceiver devices 200a, 200b are, via the TRP 205, configured to communicate with each other in beams 150, 160, 160a. More precisely, reference numerals 150, 160 refer to two beam sets, and reference numeral 160a refers to a beam in the beam set 160. Each beam set is assumed to comprise The radio transceiver devices 200a, 200b could be configured to communicate using a variety of beams having different shapes and widths, herein generally referred to as having different beam patterns.

Examples of traditional beam management for discovering and monitoring the beams 150, 160, 160a have been disclosed above. Particularly, as disclosed above, traditional mechanisms for beam management might require large overhead signalling and be time consumption, especially for analog and hybrid antenna array implementations at the TRP 205 where beams must be swept in a sequential manner.

The embodiments disclosed herein therefore relate to mechanisms for beam management of the radio transceiver device 200a, 200b where the issues noted above are avoided, or at least mitigated or reduced. In order to obtain such mechanisms there is provided a radio transceiver device 200a, 200b, a method performed by the radio transceiver device 200a, 200b, a computer program product comprising code, for example in the form of a computer program, that when run on a radio transceiver device 200a, 200b, causes the radio transceiver device 200a, 200b to perform the method.

Figure 2:
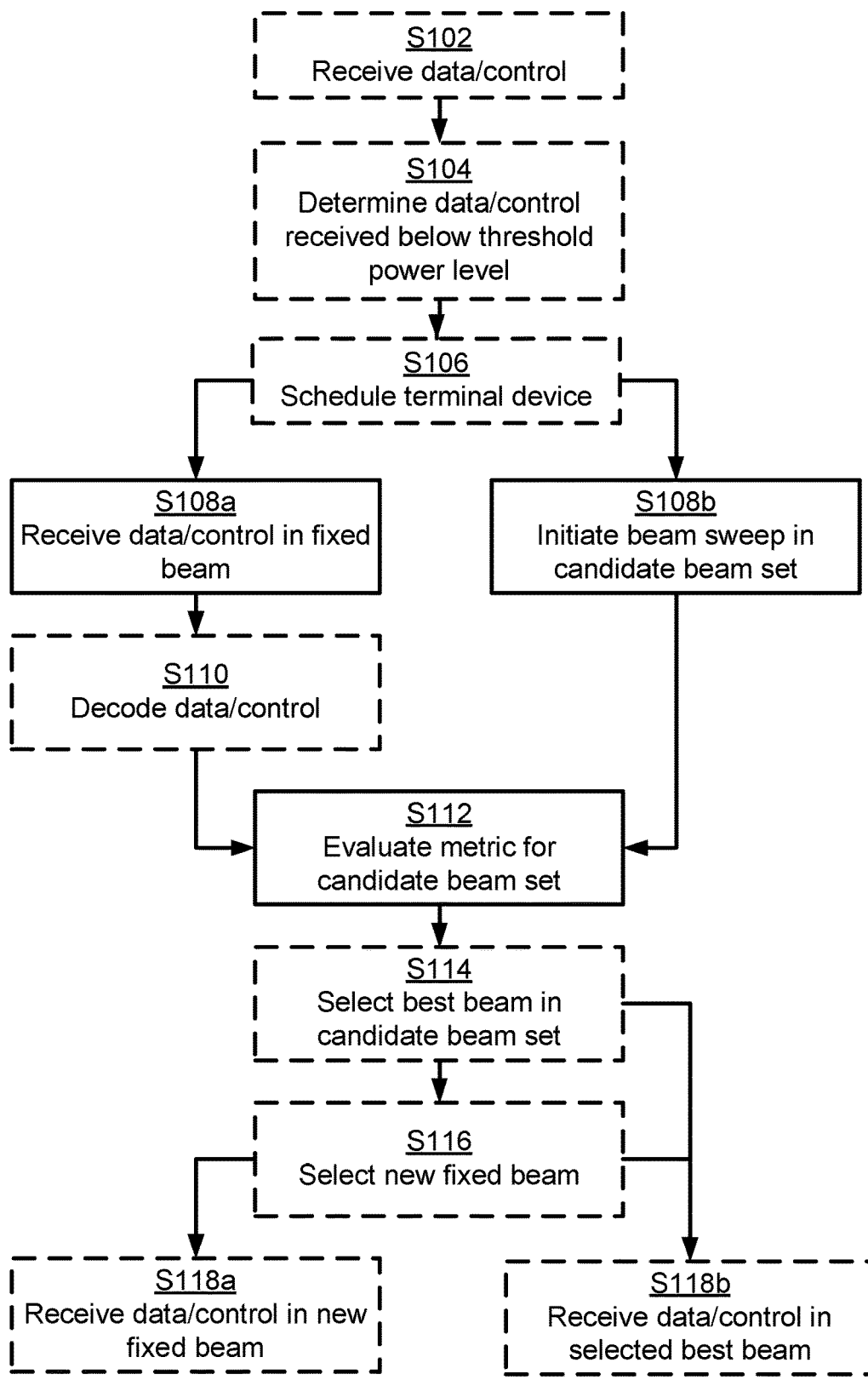
FIG. 2 is a flowchart of methods according to embodiments.

FIG. 2 is a flowchart illustrating embodiments of methods for beam management of the radio transceiver device 200a, 200b. The methods are performed by the radio transceiver device 200a, 200b. The methods are advantageously provided as computer programs 720.

It is assumed that the radio transceiver device 200a, 200b is involved in the communication of data and/or control. Particularly, the radio transceiver device 200a, 200b is configured to perform step S108a:

S108a: The radio transceiver device 200a, 200b receives a data and/or control signalling segment in a fixed reference beam 160a.

The beam management of the radio transceiver device 200a, 200b is performed whilst the radio transceiver device 200a, 200b is involved in the reception of data and/or control signalling. The radio transceiver device 200a, 200b is thus configured to perform step S108b whilst performing step S108b:

S108b: The radio transceiver device 200a, 200b initiates a beam sweep in a candidate beam set 150, whereby part of the data and/or control signalling segment is received in each of the beams in the candidate beam set 150.

The received data and/or control signalling as received in the fixed reference beam 160a can then be used as reference for the data and/or control signalling segment received in each of the beams in the candidate beam set 150. Particularly, the radio transceiver device 200a, 200b is configured to perform step S112 after step S108b:

S112: The radio transceiver device 200a, 200b evaluates, based on the part of the data and/or control signalling segment received in each of the beams in the candidate beam set 150 and using restored symbols of the data and/or control signalling segment received in the fixed reference beam 160a as reference, a quality metric for each of the beams in the candidate beam set 150.

The beams in the candidate beam set 150 are thus not evaluated based solely on the signals received in these beams. Rather, a comparison is made in step S112 between the restored symbols of the data and/or control signalling segment received in the fixed reference beam 160a and the part of the data and/or control signalling segment received in each beam in the candidate beam set 150 in order to evaluate the quality metric for each of the beams in the candidate beam set 150.

In this respect, due to the fact that the radio transceiver device 200a, 200b does not know what the data and/or control signalling segment as received using the beams in the candidate beam set 150 is, it is difficult to accurately estimate received power, or another quality metric (for example due to problems with separating the correct signals from interference and noise). However, it is assumed that the data and/or control signalling segment as received using the fixed reference beam 160a (as in step S108a) can be properly restored. Hence, the restored symbols of the data and/or control signalling segment received in the fixed reference beam 160a as reference can be used as reference for estimating received power, or another quality metric, for the data and/or control signalling segment as received using the beams in the candidate beam set 150.

That is, once the data and/or control signalling segment is, by means of the restored symbols of the data and/or control signalling segment received in the fixed reference beam 160a, known at the radio transceiver device 200a, 200b, accurate estimations of received power, or another quality metric, can be performed for the beams in the candidate beam set 150 that were swept through (as in step S108b) in a similar way as received power estimates are performed for dedicated reference signals.

The radio transceiver device 200a, 200b then (as in step S112) evaluates the received power, or another quality metric, for the beams in the candidate beam set 150 to investigate if there is any better beam compared to the fixed reference beam 160a.

Embodiments relating to further details of beam management of the radio transceiver device 200a, 200b as performed by the radio transceiver device 200a, 200b will now be disclosed.

As noted above, restored symbols of the data and/or control signalling segment received in the fixed reference beam 160a are used as reference. In some aspects, the parts of the data and/or control signalling segment received in the beams in the candidate beam set 150 are considered as parts of raw data. Hence, the restored symbols are used as reference when evaluating the quality metric on the raw data.

There could be different ways in which the data and/or control signalling segment is received in the fixed reference beam 160a whilst a part of the data and/or control signalling segment is received in each of the beams in the candidate beam set 150.

In some aspects the data and/or control signalling segments is received using at least two antenna arrays. These at least two antenna arrays could be part of the TRP 205. Particularly, according to an embodiment at least two antenna arrays are used for receiving data and/or control signalling segments, and the fixed reference beam 160a is generated at a first of the at least two antenna arrays, and the beams in the candidate beam set 150 are generated at a second of the at least two antenna arrays. That is, according to this embodiment the fixed reference beam 160a and the beams in the candidate beam set 150 are generated at two (or more) mutually different antenna arrays. That is, one antenna array could be used for receiving the data and/or control signalling segment using the fixed reference beam 160a, and another antenna array could be used for receiving the parts of the data and/or control signalling segment using the beams in the candidate beam set 150.

In some aspects the data and/or control signalling segments is received using at least two polarizations. Polarization is here generally referred to the polarization of antenna elements at one or more antenna arrays. Particularly, according to an embodiment at least two polarizations are used for receiving data and/or control signalling segments, where the fixed reference beam 160a is of a first of the at least two polarizations, and the beams in the candidate beam set 150 are of a second of the at least two polarizations. That is, according to this embodiment the fixed reference beam 160a and the beams in the candidate beam set 150 have two (or more) mutually different polarizations. That is, one antenna elements of one polarization could be used for receiving the data and/or control signalling segment using the fixed reference beam 160a, and antenna elements of another polarization could be used for receiving the parts of the data and/or control signalling segment using the beams in the candidate beam set 150.

There could be different kinds of lengths of the part of the data and/or control signalling segment. In some aspects the data and/or control signalling segment consists of orthogonal frequency-division multiplexing (OFDM) symbols. Then, each part could comprise an integer number of OFDM symbols. Particularly, according to an embodiment each part of the data and/or control signalling segment corresponds to one single OFDM symbol. That is, one OFDM symbol is received in each beam in the candidate beam set 150 during the beam sweep.

Figure 3:
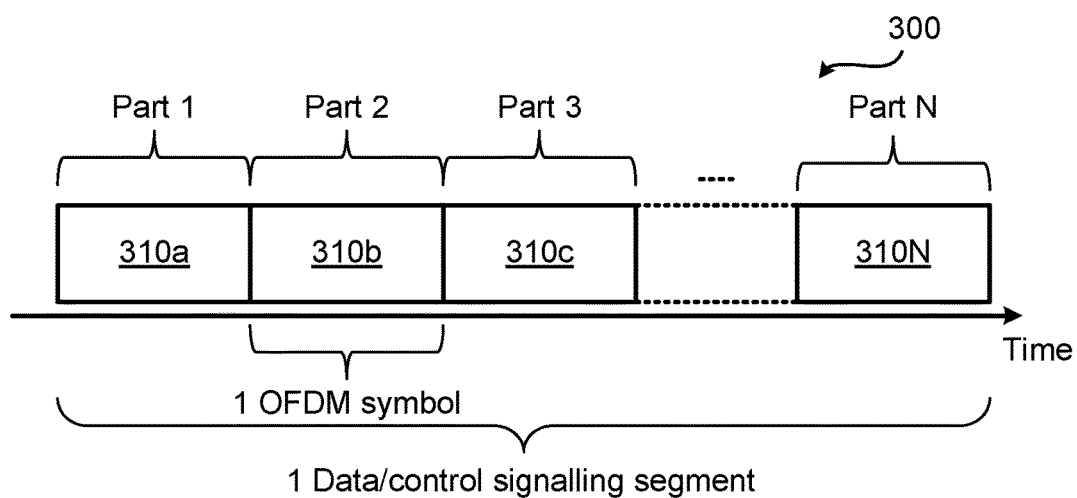
FIG. 3 schematically illustrates a data and/or control signalling segment according to an embodiment.

FIG. 3 schematically illustrates one data and/or control signalling segment 300 according to an embodiment. The data and/or control signalling segment 300 is divided into N parts 310*a*, 310*b*, 310*c*, . . . , 310N, one part for each beam in the candidate beam set 150. Each such part 310*a*, 310*b*, 310*c*, . . . , 310N is thus received in one of the beams in the candidate beam set 150.

Assume therefore that the beams in the candidate beam set 150 are denoted B1, B2, . . . , BN and hence that there are N beams in the candidate beam set 150. In this respect, N>1 and could typically have a value in the order of N=10, N=100, or N=1000. Without loss of generality it can be assumed that Part 1 is received in beam B1, that Part 2 is received in beam B2, etc., and that Part N is received in beam BN. Thus, during the beam sweep, the beams in the candidate beam set 150 are swept in order from beam B1 to beam BN. In the example of FIG. 3, each part 310*a*, 310*b*, 310*c*, . . . , 310N consists of one single OFDM symbol.

Reference signal received power (RSRP) has above been mentioned as one typical example of the quality metric. However, there could be different kinds of quality metrics. Particularly, according to an embodiment the quality metric is any of received power, received quality, signal to noise ratio, or signal to noise plus interference ratio of the part of the data and/or control signalling segment received in the beams in the candidate beam set 150.

There could be different kinds of data and/or control signalling. According to an embodiment the data and/or control signalling segment is received on any of: the Physical Uplink Control Channel (PUCCH), the Physical Uplink Shared Channel (PUSCH), the Physical Downlink Control Channel (PDCCH), and the Physical Downlink Shared Channel (PDSCH).

There may be different triggers as to when the radio transceiver device 200*a*, 200*b* is to initiate the beam sweep in step S108*b*. In some aspects the beam training (i.e. the beam sweep) is initiated in response to having detected that the quality of radio propagation channel is rapidly deteriorating, such as received power dropping faster than some threshold rate or to a level below a threshold level. Particularly, according to an embodiment the radio transceiver device 200*a*, 200*b* is configured to perform (optional) steps S102, S104:

S102: The radio transceiver device 200*a*, 200*b* receives a former data and/or control signalling segment.

S104: The radio transceiver device 200*a*, 200*b* determines that the former data and/or control signalling segment is received below a threshold reception power value. The beam sweep is then initiated (as in step S108*b*) in response thereto (i.e. in response to the radio transceiver device 200*a*, 200*b* determining that the former data and/or control signalling segment is received below the threshold reception power value).

As disclosed above, it is assumed that the data and/or control signalling segment as received using the fixed reference beam 160*a* (as in step S108*a*) can be properly restored. In order to properly restore the data and/or control signalling segment it might be needed to first decode the data and/or control signalling segment. Therefore, according to an embodiment the radio transceiver device 200*a*, 200*b* is configured to perform (optional) step S110:

S110: The radio transceiver device 200*a*, 200*b* decodes the data and/or control signalling segment received in the fixed reference beam 160*a* into decoded symbols. The decoded symbols are then used to determine the restored symbols of the data and/or control signalling. In other words, once the symbols of the data and/or control signalling have been decoded, the decoded symbols can be used to restore the data and/or control signalling, thus determining the restored symbols of the data and/or control signalling, for example by encoding the decoded symbols.

In some aspects the evaluating in step S112 results in one value of the quality metric being determined for each of the beams in the candidate beam set 150. According to an embodiment the radio transceiver device 200*a*, 200*b* is then configured to perform (optional) step S114:

S114: The radio transceiver device 200*a*, 200*b* selects that beam in the candidate beam set 150 having best quality metric value.

As disclosed above, the radio transceiver device 200*a*, 200*b* investigates if there is any better beam compared to the fixed reference beam 160*a*. Then, if such a better beam is found, the fixed reference beam 160*a* is replaced with this better beam. Particularly, according to an embodiment the fixed reference beam 160*a* is taken from a fixed beam set 160 and the radio transceiver device 200*a*, 200*b* is then configured to perform (optional) step S116:

S116: The radio transceiver device 200*a*, 200*b* selects one of the beams in the fixed beam set 160 as new fixed reference beam. The new fixed reference beam has same pointing direction 160 as the selected beam in the candidate beam set 150.

This new fixed reference beam might then be used for future reception of data and/or control signalling segments. Particularly, according to an embodiment the radio transceiver device 200*a*, 200*b* is configured to perform (optional) step S118*a*:

S118*a*: The radio transceiver device 200*a*, 200*b* receives a subsequent data and/or control signalling segment using the new fixed reference beam 160.

Additionally or alternatively, the selected beam in the candidate beam set 150 might be used for future reception of data and/or control signalling segments. Particularly, according to an embodiment the radio transceiver device 200*a*, 200*b* is configured to perform (optional) step S118*b*:

S118*b*: The radio transceiver device 200*a*, 200*b* receives the subsequent data and/or control signalling segment using the selected beam in the candidate beam set 150. The subsequent data and/or control signalling segment is received using the selected beam without another beam sweep in the candidate beam set 150 being initiated.

When one of the at least two antenna arrays or one of the at least two polarizations is not used for beam training, this one of the at least two antenna arrays or one of the at least two polarizations might also be used for reception of data and/or control signalling segments. That is, when both steps S118*a* and S118*b* are performed, subsequent data and/or control signalling segments might be received using all of the at least two antenna arrays or all of the at least two polarizations.

In this respect, and with reference back to FIG. 1, any of the beam sets 150, 160 could be used as the candidate beam set, as long as the same beam set is used as the candidate beam set during the whole beam sweep within one occurrence of the beam management.

In some aspects the radio propagation channel has equal properties in transmission direction as in reception direction. Thus channel reciprocity can be assumed and any beam suitable for reception might thus also be suitable for transmission. Particularly, according to an embodiment the selected beam is selected for future transmission of signals (such as data and/or control signals, and/or reference signals).

As disclosed above, in some aspects the radio transceiver device 200*a* is part of, integrated with, or collocated with, the network node 140. Particularly, according to an embodiment the radio transceiver device 200a is a network node 140. The data and/or control signalling segment is then received from the terminal device 170.

The radio transceiver device 200a might schedule the terminal device 170 for uplink transmission. Particularly, according to an embodiment the radio transceiver device 200a is configured to perform (optional) step S106:

S106: The radio transceiver device 200a schedules the terminal device 170 with a grant for transmission of the data and/or control signalling segment. The data and/or control signalling segment is received (as in step S108a) in response thereto (i.e. in response to the terminal device 170 being scheduled with the grant).

Further, the radio transceiver device 200a might instruct the terminal device 170 as to what configuration settings the terminal device 170 is to use for transmission of the data and/or control signalling segment to the radio transceiver device 200a. This in order for the radio transceiver device 200a to be able to correctly decode data and/or control signalling segments using only the fixed reference beam 160a. Particularly, according to an embodiment the radio transceiver device 200a is capable of correctly decode data and/or control signalling segments using only the fixed reference beam 160a for some configuration settings. These configuration settings define at least one of a maximum modulation and coding scheme, a maximum rank, and a minimum transmission power at the terminal device 170. The terminal device 170 is scheduled to use the configuration settings when transmitting the data and/or control signalling segment.

In further aspects the radio transceiver device 200a might ensure that the transmission power is constant at the terminal device 170 during the transmission of the whole data and/or control signalling segment, such that a fair comparison between the beams in the candidate beam set 150 could be applied. The radio transceiver device 200a might thus instruct the terminal device 170 to use constant power for transmission of the data and/or control signalling segment to the radio transceiver device 200a. Particularly, according to an embodiment the terminal device 170 is scheduled to transmit the data and/or control signalling segment using constant power.

As disclosed above, in other aspects the radio transceiver device 200b is part of, integrated with, or collocated with, the terminal device 170. Particularly, 300 according to an embodiment the radio transceiver device 200b is a terminal device 170. The data and/or control signalling segment is then received from the network node 140.

Figure 4:
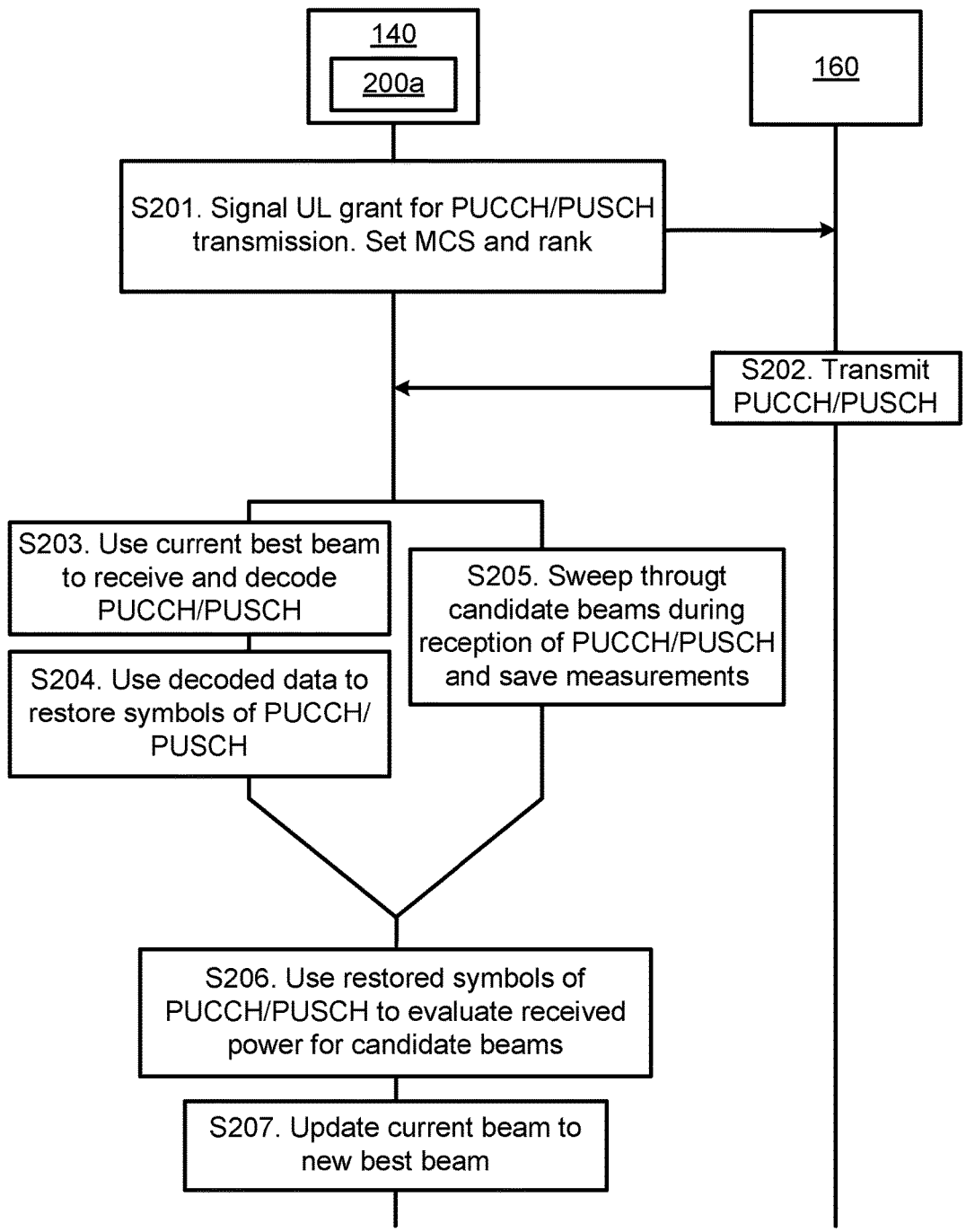
FIG. 4 is a signalling diagram according to an embodiment.

One particular embodiment for beam management of the radio transceiver device 200a, where the radio transceiver device 200a is part of, integrated with, or collocated with, the network node 140 will now be disclosed with reference to the signalling diagram of FIG. 4.

S201: The radio transceiver device 200a as part of the network node 140 schedules the terminal device 160 by signalling an uplink (UL) grant for PUCCH or PUSCH transmission and sets which modulation and coding scheme (MCS) and rank for the terminal device 160 to use. One way to implement step S201 is to perform step S106.

S202: The terminal device 160 transmits on PUCCH or PUSCH and uses the MCS and rank set by the radio transceiver device 200a.

S203: The radio transceiver device 200a as part of the network node 140 uses the current best beam as fixed reference beam 160a for receiving the PUCCH or PUSCH transmission. The received PUCCH or PUSCH transmission is then decoded into decoded data. One way to implement step S203 is to perform step S108a.

S204: The radio transceiver device 200a as part of the network node 140 uses the decoded data to restore the symbols of the PUCCH or PUSCH transmission. One way to implement step S204 is to perform step S110.

S205: The radio transceiver device 200a as part of the network node 140 initiates a beam sweep in order to receive a part of the PUCCH or PUSCH transmission in each beam of the candidate beam set 150. Measurements of the part of the PUCCH or PUSCH transmission as received in each beam are stored. One way to implement step S205 is to perform step S108b.

S206: The radio transceiver device 200a as part of the network node 140 uses the restored symbols of the PUCCH or PUSCH transmission as reference to evaluate received power of the PUCCH or PUSCH transmission in the beams of the candidate beam set 150 by comparing the measurement of the PUCCH or PUSCH transmission in each beam to the restored symbols of the PUCCH or PUSCH transmission. The received power of the PUCCH or PUSCH transmission is estimated by correlating the measurements of the part of the PUCCH or PUSCH transmission as received in each beam with the now known PUCCH or PUSCH transmission (i.e. with the restored symbols of the PUCCH or PUSCH transmission as obtained in step S204). One way to implement step S206 is to perform step S112.

S207: The radio transceiver device 200a as part of the network node 140 selects the beam in which the PUCCH or PUSCH transmission was received with highest received power as the new best beam. One way to implement step S201 is to perform any of steps S114 and S116.

Figure 5:
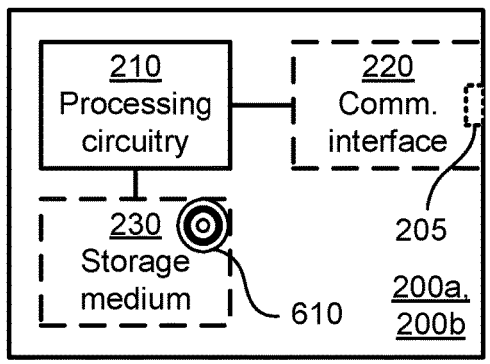
FIG. 5 is a schematic diagram showing functional units of a radio transceiver device according to an embodiment.

FIG. 5 schematically illustrates, in terms of a number of functional units, the components of a radio transceiver device 200a, 200b according to an embodiment. Processing circuitry 210 is provided using any combination of one or more of a suitable central processing unit (CPU), multiprocessor, microcontroller, digital signal processor (DSP), etc., capable of executing software instructions stored in a computer program product 710 (as in FIG. 7), e.g. in the form of a storage medium 230. The processing circuitry 210 may further be provided as at least one application specific integrated circuit (ASIC), or field programmable gate array (FPGA).

Particularly, the processing circuitry 210 is configured to cause the radio transceiver device 200a, 200b to perform a set of operations, or steps, S102-S118b, as disclosed above. For example, the storage medium 230 may store the set of operations, and the processing circuitry 210 may be configured to retrieve the set of operations from the storage medium 230 to cause the radio transceiver device 200a, 200b to perform the set of operations. The set of operations may be provided as a set of executable instructions.

Thus the processing circuitry 210 is thereby arranged to execute methods as herein disclosed. The storage medium 230 may also comprise persistent storage, which, for example, can be any single one or combination of magnetic memory, optical memory, solid state memory or even remotely mounted memory. The radio transceiver device 200a, 200b may further comprise a communications interface 220 at least configured for communications with another radio transceiver device 200a, 200b as well as with other entities, nodes, devices, and functions of the communications network 100. As such the communications interface 220 may comprise one or more transmitters and receivers, comprising analogue and digital components. In some aspects where the radio transceiver device 200b is part of, integrated with, or collocated with the network node 140, communications interface 220 might comprise the TRP 205.

The processing circuitry 210 controls the general operation of the radio transceiver device 200a, 200b e.g. by sending data and control signals to the communications interface 220 and the storage medium 230, by receiving data and reports from the communications interface 220, and by retrieving data and instructions from the storage medium 230. Other components, as well as the related functionality, of the radio transceiver device 200a, 200b are omitted in order not to obscure the concepts presented herein.

Figure 6:
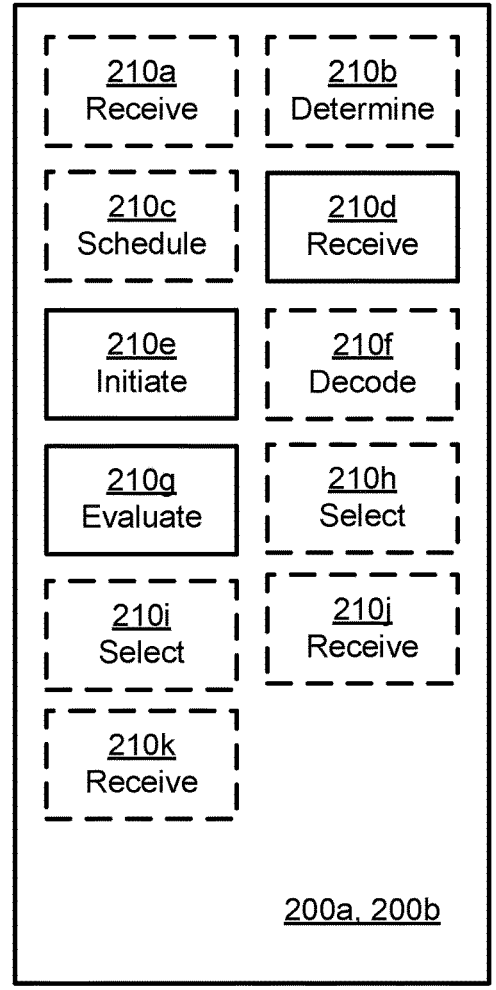
FIG. 6 is a schematic diagram showing functional modules of a radio transceiver device according to an embodiment.

FIG. 6 schematically illustrates, in terms of a number of functional modules, the components of a radio transceiver device 200a, 200b according to an embodiment. The radio transceiver device 200a, 200b of FIG. 6 comprises a number of functional modules; a receive module 210d configured to perform step S108a, an initiate module 210e configured to perform step S108b, and an evaluate module 210g configured to perform step S112. The radio transceiver device 200a, 200b of FIG. 6 may further comprise a number of optional functional modules, such as any of a receive module 210a configured to perform step S102, a determine module 210b configured to perform step S104, a schedule module 210c configured to perform step S106, a decode module 210f configured to perform step S110, a select module 210h configured to perform step S114, a select module 210i configured to perform step S116, a receive module 210j configured to perform step S118a, and a receive module 210k configured to perform step S118b.

In general terms, each functional module 210a-210k may in one embodiment be implemented only in hardware and in another embodiment with the help of software, i.e., the latter embodiment having computer program instructions stored on the storage medium 230 which when run on the processing circuitry makes the radio transceiver device 200a, 200b perform the corresponding steps mentioned above in conjunction with FIG. 5. It should also be mentioned that even though the modules correspond to parts of a computer program, they do not need to be separate modules therein, but the way in which they are implemented in software is dependent on the programming language used. Preferably, one or more or all functional modules 210a-210k may be implemented by the processing circuitry 210, possibly in cooperation with the communications interface 220 and/or the storage medium 230. The processing circuitry 210 may thus be configured to from the storage medium 230 fetch instructions as provided by a functional module 210a-210k and to execute these instructions, thereby performing any steps as disclosed herein.

The radio transceiver device 200a, 200b may be provided as a standalone device or as a part of at least one further device. For example, in accordance with the illustrative example of FIG. 1 the radio transceiver device 200a might be, or be part of, a network node 140, or the radio transceiver device 200b might be, or be part of, a terminal device 170. For example, the network node 140 (comprising the radio transceiver device 200a) might be provided in a node of the radio access network 110 or in a node of the core network 120. Further, functionality of the radio transceiver device 200a, 200b may be distributed between at least two devices, or nodes. Thus, a first portion of the instructions performed by the radio transceiver device 200a, 200b may be executed in a first device, and a second portion of the of the instructions performed by the radio transceiver device 200a, 200b may be executed in a second device; the herein disclosed embodiments are not limited to any particular number of devices on which the instructions performed by the radio transceiver device 200a, 200b may be executed. Hence, the methods according to the herein disclosed embodiments are suitable to be performed by a radio transceiver device 200a, 200b residing in a cloud computational environment. Therefore, although a single processing circuitry 210 is illustrated in FIG. 5 the processing circuitry 210 may be distributed among a plurality of devices, or nodes. The same applies to the functional modules 210a-210k of FIG. 6 and the computer program 720 of FIG. 7 (see below).

Figure 7:
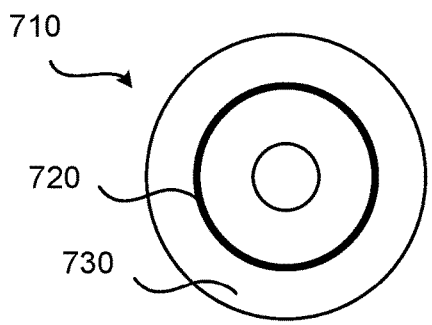
FIG. 7 shows one example of a computer program product comprising computer readable storage medium according to an embodiment.

FIG. 7 shows one example of a computer program product 710 comprising computer readable storage medium 730. On this computer readable storage medium 730, a computer program 720 can be stored, which computer program 720 can cause the processing circuitry 210 and thereto operatively coupled entities and devices, such as the communications interface 220 and the storage medium 230, to execute methods according to embodiments described herein. The computer program 720 and/or computer program product 710 may thus provide means for performing any steps as herein disclosed.

In the example of FIG. 7, the computer program product 710 is illustrated as an optical disc, such as a CD (compact disc) or a DVD (digital versatile disc) or a Blu-Ray disc. The computer program product 710 could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 720 is here schematically shown as a track on the depicted optical disk, the computer program 720 can be stored in any way which is suitable for the computer program product 710.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

The invention claimed is:

1. A method for beam management of a radio transceiver device, the method being performed by the radio transceiver device, the method comprising:
  receiving at least one taken from the group consisting of a data and a control signalling segment in a fixed reference beam where the at least one of the data and the control signalling segment is received on any of: Physical Uplink Control Channel (PUCCH), Physical Uplink Shared Channel (PUSCH), Physical Downlink Control Channel (PDCCH), and Physical Downlink Shared Channel (PDSCH), and whilst doing so:
    initiating a beam sweep in a candidate beam set, whereby part of the at least one of the data the control signalling segment is received in each of the beams in the candidate beam set, and then:
    evaluating, based on the part of the data and/or control signalling segment received in each of the beams in the candidate beam set and using restored symbols of the at least one of the data the signalling segment received in the fixed reference beam as reference, a quality metric for each of the beams in the candidate beam set.

2. The method according to claim 1, wherein the evaluating results in one value of the quality metric being determined for each of the beams in the candidate beam set, the method further comprising:
   selecting that beam in the candidate beam set having best quality metric value.

3. The method according to claim 2, wherein the fixed reference beam is taken from a fixed beam set, the method further comprising:
   selecting one of the beams in the fixed beam set as new fixed reference beam, the new fixed reference beam having same pointing direction as the selected beam in the candidate beam set; and
   receiving at least one taken from the group consisting of a subsequent data and a control signalling segment using the new fixed reference beam.

4. The method according to claim 2, further comprising:
   receiving the at least one of the subsequent data and the control signalling segment using the selected beam in the candidate beam set and without initiating another beam sweep in the candidate beam set.

5. The method according to claim 2, wherein the selected beam is selected for future transmission of signals.

6. The method according to claim 1, wherein at least two antenna arrays are used for receiving at least one of data and control signalling segments, wherein the fixed reference beam is generated at a first of the at least two antenna arrays, and wherein the beams in the candidate beam set are generated at a second of the at least two antenna arrays.

7. The method according to claim 1, wherein at least two polarizations are used for receiving the at least one of the data the control signalling segments, wherein the fixed reference beam is of a first of the at least two polarizations, and wherein the beams in the candidate beam set are of a second of the at least two polarizations.

8. The method according to claim 1, further comprising:
   receiving at least one taken from the group consisting of a former data and control signalling segment; and
   determining that the at least one of the former data and/or and the control signalling segment is received below a threshold reception power value, and wherein the beam sweep is initiated in response thereto.

9. The method according to claim 1, further comprising:
   decoding the at least one of the data and the control signalling segment received in the fixed reference beam into decoded symbols, and wherein the decoded symbols are used to determine the restored symbols of the at least one of the data and the control signalling.

10. The method according to claim 1, wherein each part of the at least one of the data and the control signalling segment corresponds to one single OFDM symbol.

11. The method according to claim 1, wherein the quality metric is any of received power, received quality, signal to noise ratio, or signal to noise plus interference ratio of the part of the at least one of the data and the control signalling segment received in the beams in the candidate beam set.

12. The method according to claim 1, wherein the radio transceiver device is a terminal device, and wherein the at least one of the data and the control signalling segment is received from a network node.

13. The method according to claim 1, wherein the radio transceiver device is a network node, and wherein the at least one of the data and the control signalling segment is received from a terminal device.

14. The method according to claim 13, further comprising:
   scheduling the terminal device with a grant for transmission of the at least one of the data and the control signalling segment, and wherein the data and/or control signalling segment is received in response thereto.

15. The method according to claim 14, wherein the radio transceiver device is configured to correctly decode at least one of the data and the control signalling segments using only the fixed reference beam for configuration settings defining at least one of a maximum modulation and coding scheme, a maximum rank, and a minimum transmission power at the terminal device, and wherein the terminal device is scheduled to use the configuration settings when transmitting the at least one of the data and the control signalling segment.

16. The method according to claim 14, wherein the terminal device is scheduled to transmit the at least one of the data and the control signalling segment using constant power.

17. A radio transceiver device for beam management of the radio transceiver device, the radio transceiver device comprising:
   a receive module configured to receive at least one taken from the group consisting of a data and a control signalling segment in a fixed reference beam, the at least one of the data and the control signalling segment being received on any of: Physical Uplink Control Channel (PUCCH), Physical Uplink Shared Channel (PUSCH), Physical Downlink Control Channel (PDCCH), and Physical Downlink Shared Channel (PDSCH);
   an initiate module configured to initiate a beam sweep in a candidate beam set, whereby part of the at least one of the data and the control signalling segment is received in each of the beams in the candidate beam set; and
   an evaluate module configured to evaluate, based on the part of the at least one of the data and the control signalling segment received in each of the beams in the candidate beam set and using restored symbols of the at least one of the data and the control signalling segment received in the fixed reference beam as reference, a quality metric for each of the beams in the candidate beam set.

18. A radio transceiver device for beam management of the radio transceiver device, the radio transceiver device comprising processing circuitry, the processing circuitry being configured to cause the radio transceiver device to:
   receive at least one taken from the group consisting of a data and a control signalling segment in a fixed reference beam where the at least one of the data and the control signalling segment is received on any of: Physical Uplink Control Channel (PUCCH), Physical Uplink Shared Channel (PUSCH), Physical Downlink Control Channel (PDCCH), and Physical Downlink Shared Channel (PDSCH), and whilst doing so:
   initiate a beam sweep in a candidate beam set, whereby part of the at least one of the data and the control signalling segment is received in each of the beams in the candidate beam set, and then:
   evaluate, based on the part of the at least one of the data and the control signalling segment received in each of the beams in the candidate beam set and using restored symbols of the at least one of the data and the control signalling segment received in the fixed reference beam as reference, a quality metric for each of the beams in the candidate beam set.

19. The radio transceiver device according to claim 18, wherein the radio transceiver device is a network node, and wherein the at least one of the data and the control signalling segment is received from a terminal device.

20. The radio transceiver device according to claim 18, wherein the radio transceiver device is a terminal device, and wherein the at least one of the data and the control signalling segment is received from a network node.

21. A non-transitory computer storage medium storing a computer program for beam management of a radio transceiver device, the computer program comprising computer code which, when run on processing circuitry of the radio transceiver device, causes the radio transceiver device to:
  receive at least one taken from the group consisting of a data and a control signalling segment in a fixed reference beam where the at least one of the data and the control signalling segment is received on any of: Physical Uplink Control Channel (PUCCH), Physical Uplink Shared Channel (PUSCH), Physical Downlink Control Channel (PDCCH), and Physical Downlink Shared Channel (PDSCH), and whilst doing so:
  initiate a beam sweep in a candidate beam set, whereby part of the at least one of the data and the control signalling segment is received in each of the beams in the candidate beam set; and then:
  evaluate, based on the part of the at least one of the data and the control signalling segment received in each of the beams in the candidate beam set and using restored symbols of the at least one of the data and the control signalling segment received in the fixed reference beam as reference, a quality metric for each of the beams in the candidate beam set.

* * * * *